United States Patent Office 3,398,389
Patented Aug. 20, 1968

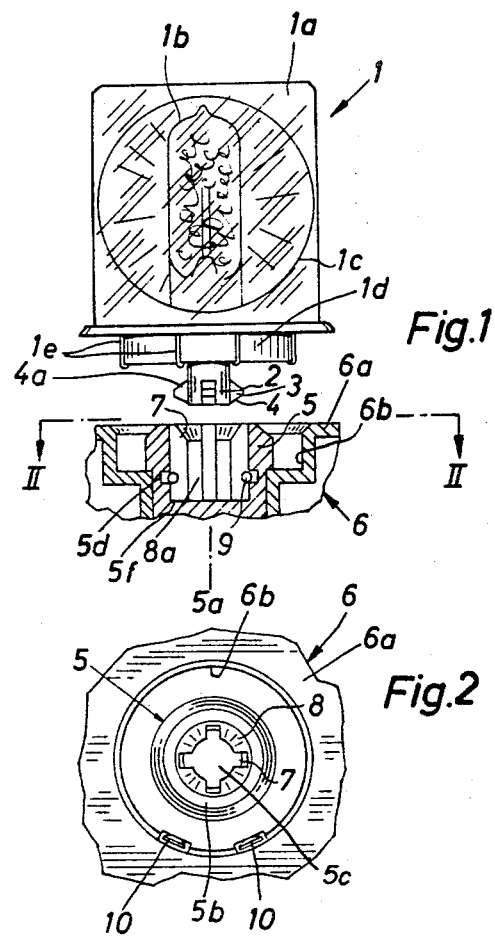

3,398,389
FLASH UNIT
Artur Fischer, 133 Grunmettstetter Str., 7241 Tumlingen uber Horb, Germany, and Gerhard Porlein, Tumlingen uber Horb, Germany; said Porlein assignor to said Fischer
Filed Oct. 19, 1966, Ser. No. 587,912
Claims priority, application Germany, Nov. 11, 1965, F 29,101
10 Claims. (Cl. 339—65)

ABSTRACT OF THE DISCLOSURE

A flash unit with an indexible socket which defines a recess for the plug of a multiple flash bulb holder and is provided with grooves communicating with the recess and receiving teeth of the plug when the latter is inserted into the recess. The outer end of the recess is bounded by a conical internal surface which tapers inwardly and guides the teeth into alignment with grooves when the multiple flash bulb holder is turned with reference to the socket or vice versa while the leading edge faces of teeth abut against the conical internal surface.

---

The present invention relates to flash units for photographic cameras, and more particularly to improvements in flash units of the type which utilize multiple flash bulb holders, for example, those known as "Flashcubes."

Presently known flash units which utilize "Flashcubes" and similar rotary multiple flash bulb holders are provided with indexible sockets capable of receiving and retaining the plug of a multiple flash bulb holder. In order to facilitate the introduction of the plug into the recess of the socket, the latter is normally provided with a guide pin which enters a bore of the plug when the plug is properly introduced into the socket. However, it happens again and again that the user encounters difficulties in rapidly introducing the plug of a fresh multiple flash bulb holder, especially if a spent holder is to be replaced in a darkened room. Also, the provision of guide pins on the sockets of such flash units adds to the complicatedness of dies or molds.

Accordingly, it is an important object of our invention to provide a flash unit with a greatly simplified socket which can be rapidly and conveniently coupled with the plug of a multiple flash bulb holder and enables a user to properly attach the holder in a dark room and with the same degree of accuracy as in a fully illuminated area.

Another object of the invention is to provide a multiple flash bulb holder which may be used with a flash unit embodying the above outlined socket.

A further object of the invention is to provide a socket for use in flash units which employ multiple flash bulb holders and to construct the socket in such a way that it can take a plug even though it does not have a guide pin.

An additional object of the invention is to provide a flash unit which embodies the above outlined socket and which can be built into a photographic camera or forms a separate entity which may be attached to the camera by means of a conventional foot receivable in the standard accessory shoe on the housing of a camera.

A concomitant object of the invention is to provide a socket for use in flash units employing "Flashcubes" or analogous multiple flash bulb holders, and to construct the socket in such a way that it can be mass-produced by restoring to simple machinery.

Briefly stated, one feature of our invention resides in the provision of a flash unit for photographic cameras. The flash unit comprises a housing which can form part of the camera housing and receives a socket rotatable about a predetermined axis. The socket has an exposed surface provided with a centrally located recess having a funnel-shaped outer portion adjacent to the exposed surface and an inner portion. The socket is further provided with a conical surface which surrounds the outer portion of its recess and tapers inwardly toward the axis about which the socket can rotate to place a fresh bulb into optimum position for illumination of the subject during an exposure with flash, and with at least one axially parallel radially outwardly extending groove communicating with the recess. A multiple flash bulb holder which can be used in the improved flash unit comprises a customary plug which is receivable in the recess and has at least one radially outwardly extending projection or tooth which can be received in the groove. In order to facilitate its introduction into the groove, the tooth is preferably provided with an inclined leading edge face whose inclination with reference to the axis of the plug is preferably the same as the inclination of the conical surface with reference to the socket axis. If the user is clumsy or is compelled to attach a fresh holder in darkness, and if the leading edge face of the tooth happens to be placed against the conical surface, the plug is automatically placed into reigstry with the inner portion of the recess and the tooth will readily find its way into the groove in response to angular displacement of the holder.

Suitable radially expansible resilient retaining means may be provided in the socket to engage a fully inserted tooth and to thus yieldably hold the plug against accidental withdrawal from the socket. The socket may be indexed by a manually operated wheel, by the film transporting mechanism of a camera, or by the shutter release of the camera.

The novel features which are considered as characteristic of the invention are set forth in particular in the appended claims. The improved flash unit itself, however, both as to its construction and the mode of operating the same, together with additional features and advantages thereof, will be best understood upon perusal of the following detailed description of a specific embodiment with reference to the accompanying drawings, in which:

FIG. 1 is a fragmentary section through the housing of a flash unit which embodies our invention, a multiple flash bulb holder being shown separated from the socket which latter is illustrated in axial section; and FIG. 2 is a top plan view of the socket as seen in the direction of arrows from the line II—II of FIG. 1.

Referring to the drawings in detail, the numeral 6 denotes the housing of a flash unit which may be built into or is detachable from the housing of a photographic camera. If the flash unit is of the built-in type, the housing 6 constitutes the housing of the camera. This housing has a top wall 6a provided with a circular recess 6b accommodating a rotary socket 5 which can be rotated about an axis 5a and is indexible by a suitable wheel or lever, by the film transporting mechanism of the camera, or by the shutter release trigger. Such indexing means are not shown because they form no part of the present invention. The exposed surface 5b of the socket 5 is provided with a centrally located recess 5c which resembles a blind bore and includes a funnel-shaped outer portion bounded by a conical surface 8, and an inner portion bounded by a cylindrical surface 8a. The socket 5 is further provided with four equidistant radially outwardly extending axially parallel grooves 7 each of which extends along the full length of and communicates with both portions of the recess 5c. The axial length of the outer portion of the recess 5c may be a small fraction of the axial length of the remainder of this recess. A radially expansible annular retaining spring 9 is accommodated in an internal annular channel 5d communicating with the grooves 7 at a level below the conical surface 8 and normally extends into the grooves. The purpose of the spring 9 is to engage and to yieldably hold four projections or teeth 3 provided on and extending radially from a cylindrical plug 2 forming part of a multiple flash bulb holder 1 of the type known as "Flashcube." This holder has four transparent vertical sides 1a each located in front of a flash bulb 1b, and each such flash bulb is located in front of a reflector 1c. The base having a skirt portion at 1d of the holder 1 carries the plug 2 and is further provided with four pairs of electric terminals 1e, one pair for each flash bulb 1b.

When the plug 2 is properly accommodated in the socket 5, it extends all the way to the bottom surface 5f in the recess 5c and each of the four teeth 3 is received in one of the grooves 7 to insure that the socket 5 will rotate the holder 1 in response to indexing whereby a fresh (unexpended) flash bulb 1b can be moved to a position in which it faces the subject prior to making the next exposure with flash. The socket 5 is indexible through 90 degrees or through a multiple of 90 degrees.

During insertion of the plug 2, the inclined leading edge faces or flanks 4 of the teeth 3 first expand the retaining spring 9 whereupon the latter contracts and engages the oppositely inclined rear edge faces 4a of the teeth to hold the plug 2 with a certain force which suffices to prevent accidental detachment of the holder 1. The inclination of the leading edge faces 4 with reference to the axis of the plug 2 is preferably the same as the taper of the conical surface 8 with reference to the axis 5a of the socket 5. If the edge faces 4 happen to be placed against the conical surface 8 and the user continues to push the holder 1 toward the exposed surface 5b of the socket 5, the plug 2 is automatically centered and registers with the inner portion of the recess 5c. A small angular displacement of the holder 1 then suffices to align the teeth 2 with the grooves 7, whereupon the teeth enter the respective grooves and expand the spring 9 in response to further pressure against the holder.

The socket 5 may be made of metallic or synthetic plastic material. The terminals 10 of the housing 6 can be engaged by one of the terminal pairs 1e at a time and form part of the flash circuit which further includes a battery, a capacitor and a synchronizing switch.

It is clear that the socket 5 may be formed with a single groove 7 or with two, three, five or more grooves, depending on the number of teeth 3 on the plug 2. As a rule, four grooves will suffice, and such grooves are preferably equidistant from each other to form with the recess 5c a cruciform cavity (see FIG. 2). The larger the number of grooves, the smaller is the angle which must be described by a holder in order to place its teeth 3 into registry with the grooves.

The plug 2 may be a solid cylinder or a tube and preferably consists of insulating synthetic plastic material. Of course, the improved socket may be used with equal advantage with other types of multiple flash bulb holders which are provided with plugs receivable in the recess 5c and having one or more radially extending teeth.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In a flash unit for photographic cameras, a housing having an outer surface which is formed to provide an inwardly stepped annular recess joining an inwardly-directed central cylindrical bearing surface of a diameter smaller than said recess; a socket having an enlarged annular portion extending upwardly from the bottom of said recess and forming therewith an annular channel, and having a portion in bearing relation with said surface for rotation of said socket in said housing about a predetermined axis and said socket having an exposed surface provided with a centrally located recess having an outer portion adjacent to said exposed surface and an inner portion, said socket further having a conical internal surface bounding said outer portion and tapering inwardly from said exposed surface, and at least one radially outwardly extending groove communicating with said recess; and a multiple flash bulb holder having a skirt portion receivable in said channel and a plug removably accommodated in said recess and provided with at least one tooth removably received in said groove, said tooth having a face which abuts against said conical internal surface prior to full introduction of said plug into said recess and when the plug is in substantial registry with said recess while the tooth is out of registry with said groove so that the tooth can be placed into registry with and introduced into said groove in response to relative angular displacement between said holder and said socket while the face of said tooth continues to abut against said conical internal surface.

2. A structure as set forth in claim 1, wherein said socket has four equidistant axially parallel radial grooves and said plug has an equal number of teeth each received in one of said grooves.

3. A structure as set forth in claim 1, wherein said face of said tooth is an edge face and wherein the inclination of said edge face with reference to the axis of said plug at least approximates the taper of said conical internal surface with reference to the axis of said socket.

4. A structure as set forth in claim 1, wherein the inner portion of said recess is of substantially circular outline and said tooth is received in that portion of said groove which communicates with the inner portion of said recess when the plug is introduced into said inner portion.

5. A structure as set forth in claim 1, further comprising radially expansible resilient retaining means received in an internal annular channel of said socket located inwardly of said conical surface, said retaining means being arranged to releasably hold said tooth in said groove when said plug extends into the inner portion of said recess.

6. A structure as set forth in claim 1, wherein said holder has four flash bulbs.

7. A structure as set forth in claim 1, wherein said housing is the housing of a photographic camera.

8. A structure as set forth in claim 1, wherein the axial length of said outer portion of the recess is a fraction of the axial length of said inner portion.

9. A structure as set forth in claim 1, wherein said face of said tooth is a leading edge face and said tooth further comprises a trailing edge face which is inclined with reference to said leading edge face, said leading edge face being inclined with reference to the axis of said plug and its inclination with reference to the axis of said plug being such that it equals the taper of said conical internal surface when the axis of said plug is parallel to the axis of said socket.

10. A structure as set forth in claim 1, wherein said socket has a bottom surface at the inner end of said recess and said plug is movable into abutment with said bottom surface.

References Cited

UNITED STATES PATENTS

| | | | |
|---|---|---|---|
| 3,091,748 | 5/1963 | Takes et al. | 339—65 |
| 3,312,086 | 4/1967 | Casebeer et al. | |
| 3,319,548 | 5/1967 | Kottler. | |
| 3,335,651 | 8/1967 | Williams et al. | 95—11 |
| 2,786,189 | 3/1957 | Sargis | 339—69 X |

FOREIGN PATENTS 192,815    2/1923    Great Britain.

RICHARD E. MOORE, *Primary Examiner.*